United States Patent [19]

Ohde et al.

[11] Patent Number: 5,448,388
[45] Date of Patent: Sep. 5, 1995

[54] OPTICAL SUBSCRIBER LINE SYSTEM

[75] Inventors: Hiroyuki Ohde; Noriyuki Kutsuwada, both of Kawasaki, Japan

[73] Assignee: Fujitsu Limited, Kawasaki, Japan

[21] Appl. No.: 277,140

[22] Filed: Jul. 19, 1994

Related U.S. Application Data

[63] Continuation of Ser. No. 883,031, May 14, 1992, abandoned.

[30] Foreign Application Priority Data

May 16, 1991 [JP] Japan .................................. 3-111433

[51] Int. Cl.⁶ ........................ H04J 14/00; H04J 14/08
[52] U.S. Cl. .................................. 359/115; 359/125; 359/137; 359/110; 370/112
[58] Field of Search ............... 359/113, 114, 115, 117, 359/118, 119, 123, 124, 125, 173, 135, 137, 110; 370/84, 112

[56] References Cited

U.S. PATENT DOCUMENTS

| | | | |
|---|---|---|---|
| 4,723,237 | 2/1988 | Andrew et al. | 370/11 |
| 4,768,188 | 8/1988 | Barnhart et al. | 370/80 |
| 4,965,790 | 10/1990 | Nishino et al. | 370/85.12 |
| 4,994,909 | 2/1991 | Graves et al. | 359/137 |
| 5,086,424 | 2/1992 | Motohashi et al. | 370/112 |
| 5,121,385 | 6/1992 | Tominaga et al. | 370/112 |
| 5,189,410 | 2/1993 | Kosugi et al. | 359/117 |
| 5,189,673 | 2/1993 | Burton et al. | 370/110.1 |

*Primary Examiner*—Leo H. Boudreau
*Assistant Examiner*—Rafael Bacares
*Attorney, Agent, or Firm*—Staas & Halsey

[57] ABSTRACT

An optical subscriber line system includes a multiplexer/demultiplexer unit connected to an optical transmission medium, a plurality of relay units to which subscriber terminals are connected, and a plurality of optical transmission paths optically connecting the multiplexer/demultiplexer unit and the relay units to each other. The multiplexer/demultiplexer unit includes a multiplexer/demultiplexer unit for executing a multiplexing and demultiplexing operation on a first multiplexed signal and first digital signals. The first multiplexed signal is transferred, in the form of a light signal, through the optical transmission medium. The multiplexer/demultiplexer unit includes first interface units, respectively provided for the optical transmission paths, for establishing a first interface between the first digital signals and second multiplexed light signals respectively transferred through the optical transmission paths.

26 Claims, 12 Drawing Sheets

PRIMARY RATE MULTIPLEXER / DEMULTIPLEXER

OPTICAL SUBSCRIBER LINE SYSTEM

This application is a continuation of application Ser. No. 07/883,031, filed May 14, 1992, now abandoned.

BACKGROUND OF THE INVENTION

1. Field of the Invention

The present invention generally relates to a subscriber line system for transmitting signals, such as speech signals, and more particularly to an optical subscriber line system in which subscriber lines are free of maintenance, and terminals can efficiently share spare lines.

2. Description of the Related Art

As communication networks expand, subscriber line circuits become more complicated. There is an increased number of cases where subscriber line circuits in use are required to be changed due to an increase in the number and/or movement of subscribers. There is currently a demand to make the subscriber line circuits free of maintenance and reduce the load of maintenance and operation necessary for changing the subscriber line circuits. In view of the above, it is required that the subscriber lines be formed with optical lines.

In a conventional subscriber line system, 64 kHz signals, each amounting to one telephone line, are individually transferred through respective metallic lines. A plurality of metallic lines, to which subscriber terminals are connected, are grouped and laid to a repeater station. Generally, spare lines are laid in order to cope with an increase in the number of subscribers and movement thereof. In the conventional technique, lines separate from working lines are laid beforehand, as spare lines. Such spare lines are laid so that they connect relays to each other.

FIG. 1 is a block diagram of a conventional configuration in which spare lines are provided. A multiplexer/demultiplexer unit 11 multiplexes subscriber line signals with each other to generate a primary rate output signal, and demultiplexes a primary rate input signal into subscriber line signals. A plurality of relays $13_1$-$13_n$ (where n is an integer) are connected to the multiplexer/demultiplexer 11. A plurality of telephone sets (subscriber terminals) 12 are connected to each of the relays $13_1$-$13_n$. Five telephone sets 12 are connected to the relay $13_n$, and thus five subscriber lines are connected between the multiplexer 11 and the relay $13_n$. In the same manner, subscriber lines equal in number to the telephone sets are respectively provided between the multiplexer/demultiplexer unit 11 and each of the relays $13_1$-$13_{n-1}$. Further, a spare line is provided per some of the relays $13_1$-$13_n$. In the configuration shown in FIG. 1, a spare line $14_1$ is provided to the relays $13_1$ and $13_2$, and a common spare line $14_2$ is provided to the relays $13_{n-1}$. If a new subscriber terminal $12_1$ is connected to the relay $13_1$, a connection with the multiplexer/demultiplexer unit 11 through the spare line $14_1$ is made, while the spare line $14_1$ is disconnected from the relay $13_2$.

FIG. 2 shows the multiplexer/demultiplexer unit 11 shown in FIG. 1. The multiplexer/demultiplexer unit 11 comprises a primary rate multiplexer/demultiplexer 16, 24 speech processors (coder/decoders) $17_1$ (#1)–$17_{24}$ (#24), and a bus 18. The primary rate multiplexer/demultiplexer 16 multiplexes speech signals with each other to thereby generate the primary order output signal, and demultiplexes the primary order input signal into speech signals. Each of the speech processors $17_1$–$17_{24}$ encodes speech signals into subscriber line signals, and decodes subscriber line signals into speech signals. The bus 18 connects the primary rate multiplexer/demultiplexer 16 to the speech processors $17_1$–$17_{24}$. The bus 18 transfers the subscriber line signals of the 24 channels.

As has been described previously, each time a new subscriber is connected to one of the relays $13_1$–$13_n$, it is necessary to disconnect, from the spare line, the other relay or relays connected to the above spare line. It is required that the above disconnecting operation be omitted. Further, as the number of subscribers increases and the system is expanded, the load of maintenance increases. Thus it is required that the subscriber lines be free of maintenance.

SUMMARY OF THE INVENTION

It is a general object of the present invention to provide an optical subscriber line system in which the above disadvantage is eliminated.

A more specific object of the present invention is to provide an optical subscriber line system in which the subscriber lines are free of maintenance.

The above objects of the present invention are achieved by an optical subscriber line system comprising a multiplexer/demultiplexer unit connected to an optical transmission medium; a plurality of relay units to which subscriber terminals are connected; and a plurality of optical transmission paths optically connecting the multiplexer/demultiplexer unit and the relay units to each other. The multiplexer/demultiplexer unit comprises multiplexer/demultiplexer executing a multiplexing and demultiplexing operation on a first multiplexed signal and first digital signals, the first multiplexed signal being transferred, in the form of a light signal, through the optical transmission medium; and first interface, respectively provided for the optical transmission paths, for establishing a first interface between the first digital signals and second multiplexed light signals respectively transferred through the optical transmission paths. The relay units respectively comprise second interface for establishing a second interface between the second multiplexed light signals and second digital signals; and a speech processor, coupled to the second interface, for converting the second digital signals into analog signals supplied to the subscriber terminals and for converting analog signals from the subscriber terminals into the second digital signals.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

Figure 3:
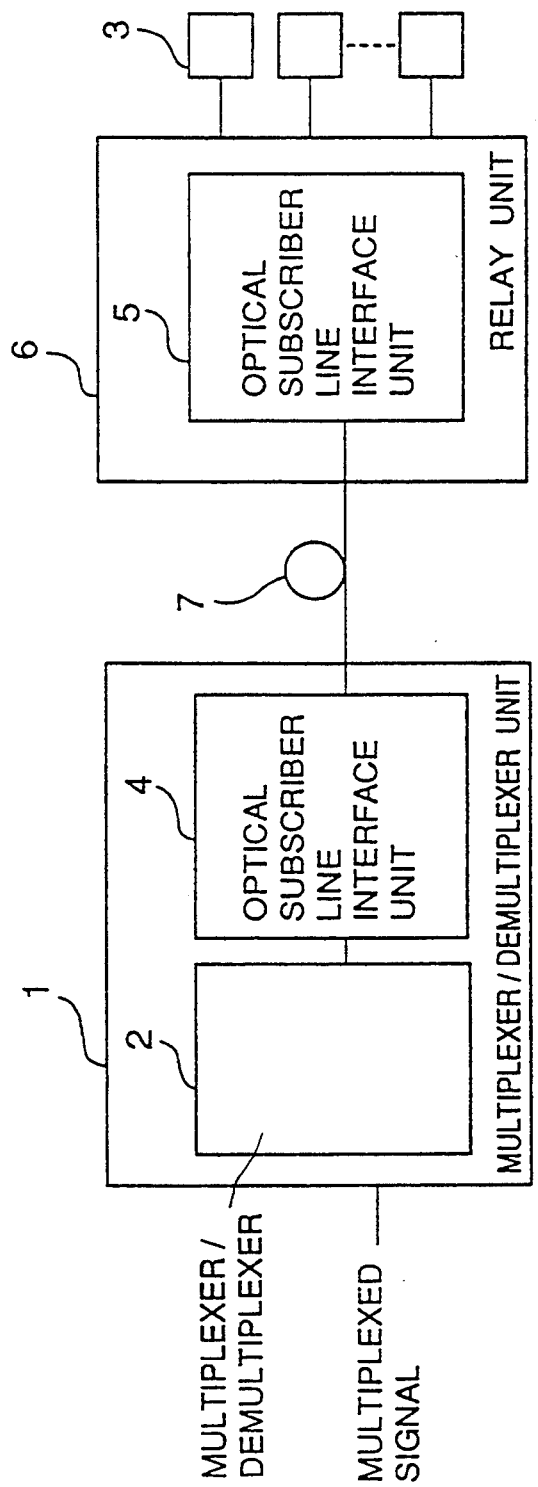
FIG. 3 is a block diagram illustrating an overview of the present invention.

FIG. 3 shows an overview of the present invention. An optical subscriber line system shown in FIG. 3 comprises a multiplexer/demultiplexer unit 1, a relay unit 6, subscriber terminals 3, and an optical transmission line 7. The multiplexer/demultiplexer unit 1 and the relay unit 6 are optically connected by the optical transmission line 7. The subscriber terminals 3 are connected to the relay unit 6. The multiplexer/demultiplexer unit 1 comprises a multiplexer/demultiplexer 2 and an optical subscriber line interface unit 4. The relay unit 6 comprises an optical subscriber line interface unit 5.

The optical subscriber line interface unit 4 of the multiplexer/demultiplexer unit 1 establishes an interface between signals of a plurality of channels related to the multiplexer/demultiplexer 2 and a multiplexed light signal containing signals or data of a plurality of channels. The optical subscriber line interface unit 5 of the relay unit 6 establishes an interface between the multiplexed light signal and signals of a plurality of channels.

Figure 4:
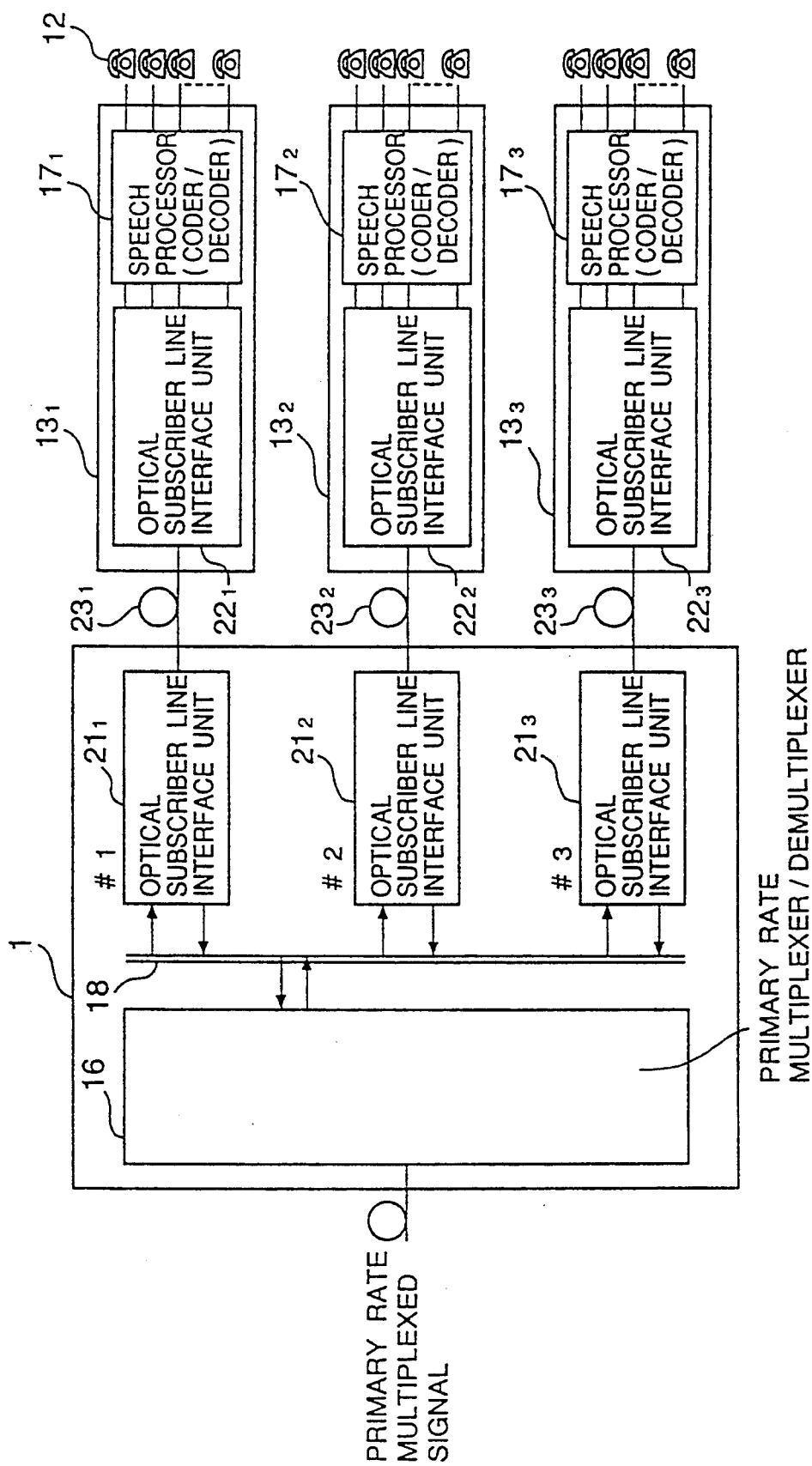
FIG. 4 is a block diagram of an embodiment of the present invention.

FIG. 4 shows the system structure shown in FIG. 3 in more detail. In FIG. 4, those parts which are the same as those shown in the previously described figures are given the same reference numerals. The multiplexer/demultiplexer 1 comprises a primary rate multiplexer/demultiplexer 16, the bus 18, and a plurality of (three) optical subscriber line interface units $21_1$–$21_3$. The system shown in FIG. 4 comprises relay units $13_1$–$13_3$, which are coupled to the optical subscriber line interface units $21_1$–$21_3$ through optical transmission lines $23_1$–$23_3$, respectively. The relay unit $13_1$ comprises an optical subscriber line interface unit $22_1$ and a speech processing unit (speech codec) $17_1$. The relay unit $13_2$ comprises an optical subscriber line interface unit $22_2$ and a speech processing unit (speech codec) $17_2$. The relay unit $13_3$ comprises an optical subscriber line interface unit $22_3$ and a speech processing unit (speech codec) $17_3$.

The optical subscriber line interface units $21_1$–$21_3$ establish respective interfaces between the primary rate multiplexer/demultiplexer 16 and the corresponding optical transmission lines $23_1$–$23_3$. The optical subscriber line interface units $22_1$–$22_3$ establish respective interfaces between the optical transmission lines $23_1$–$23_3$ and the speech processing units $17_1$–$17_3$.

Figure 1:
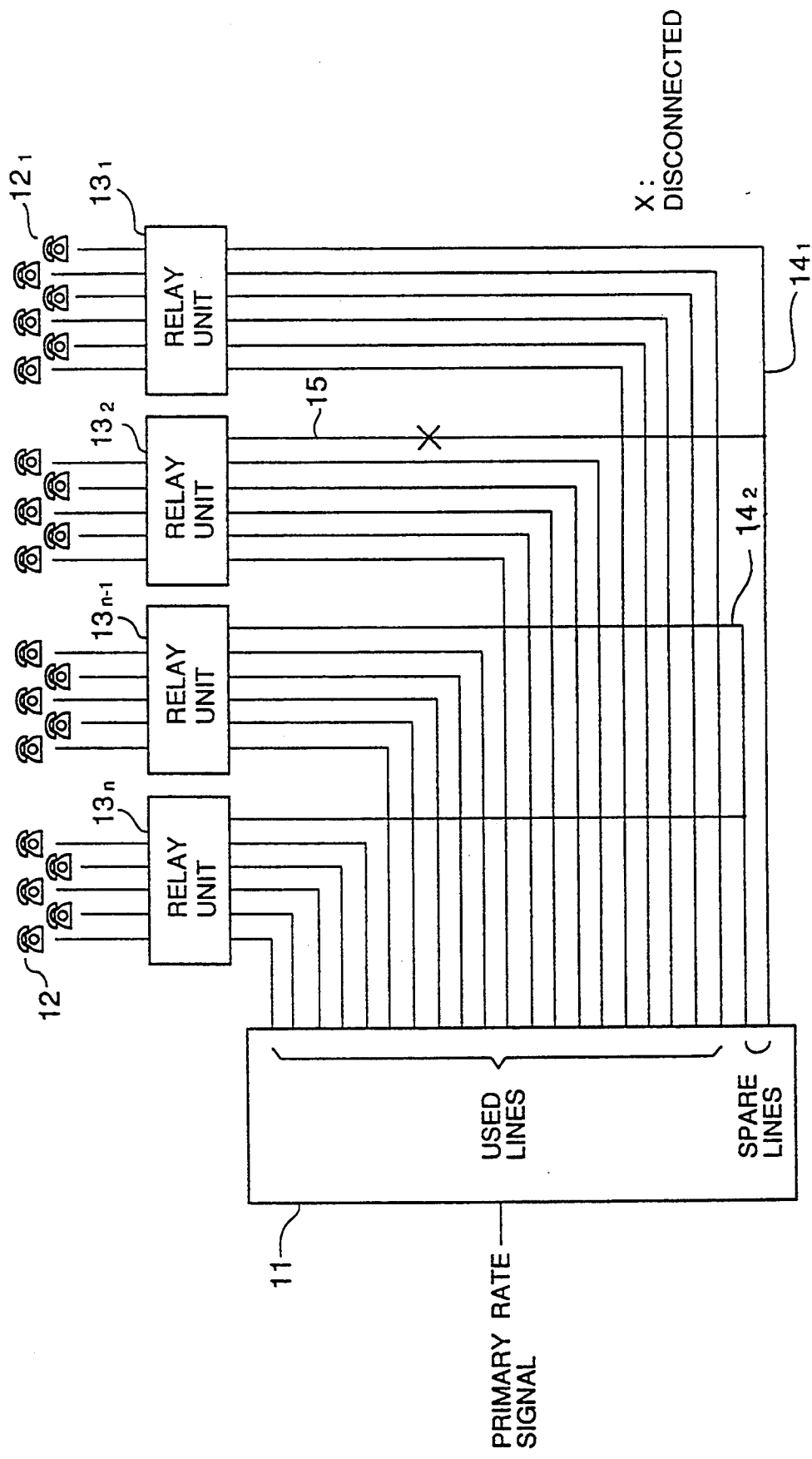
FIG. 1 is a block diagram of a conventional subscriber line system using spare lines.
Figure 2:
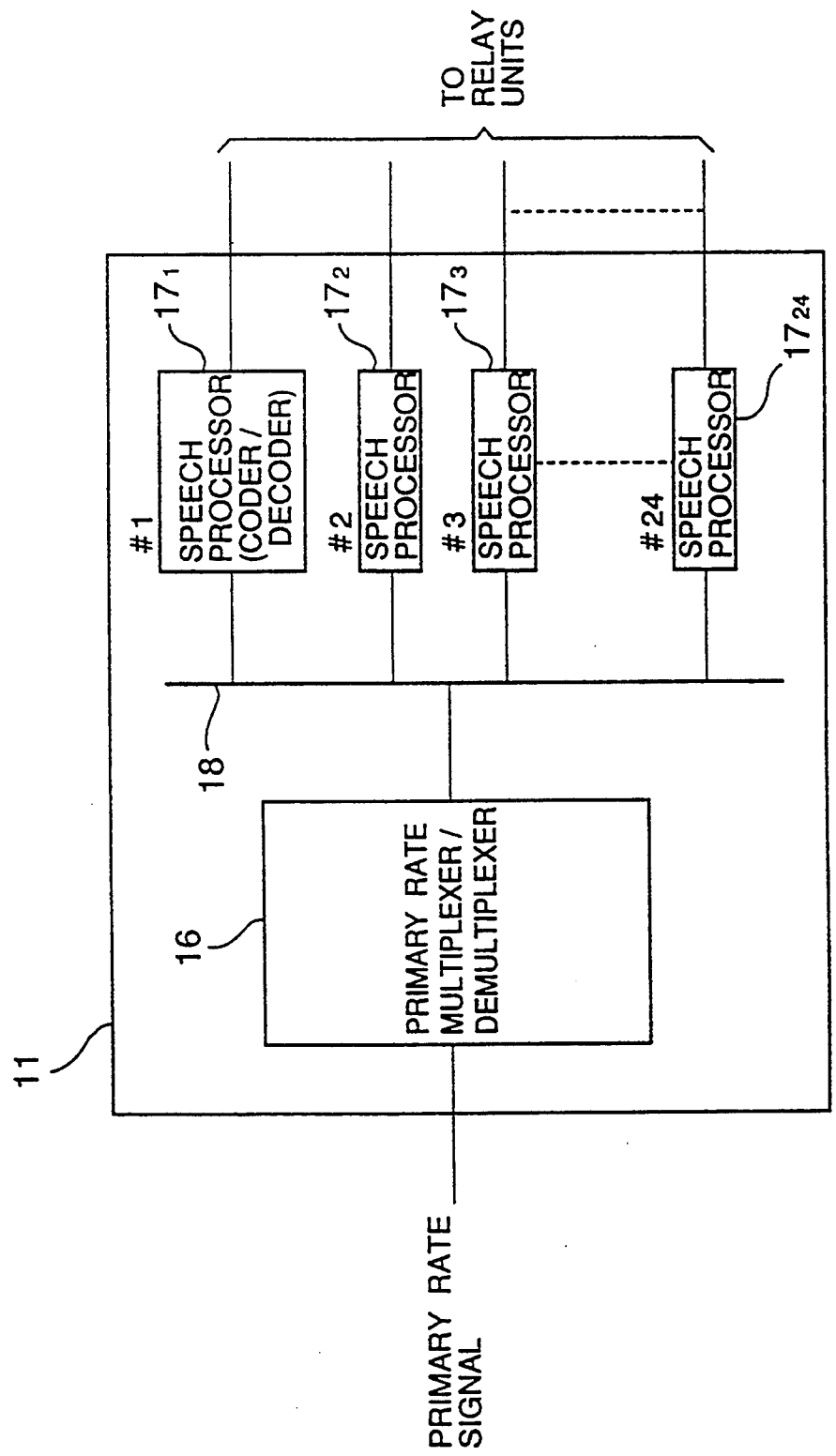
FIG. 2 is a block diagram of a conventional multiplexer/demultiplexer unit.

The relay units $13_1$–$13_3$ comprise the speech processing units $17_1$–$17_3$, respectively, while in the conventional technique the speech processing units are provided in the multiplexer/demultiplexer unit 11, as shown in FIG. 2. Further, the multiplexer/demultiplexer unit 1 and the relay units $13_1$–$13_3$ are optically coupled to each other through the optical transmission lines $23_1$–$23_3$ by the optical subscriber line interface units $21_1$–$21_3$ and $22_2$–$22_3$. Each of the optical subscriber line interface units $21_1$–$21_3$ accesses the internal bus 18 and inputs necessary time-slot data. Then the interface units $21_1$–$21_3$ multiplex only necessary time-slot data with each other and generate a multiplexed light signal, which conforms to a format for the optical transmission lines $23_1$–$23_3$. Further, each of the interface units $21_1$–$21_3$ executes an operation opposite to the above.

Figure 5:
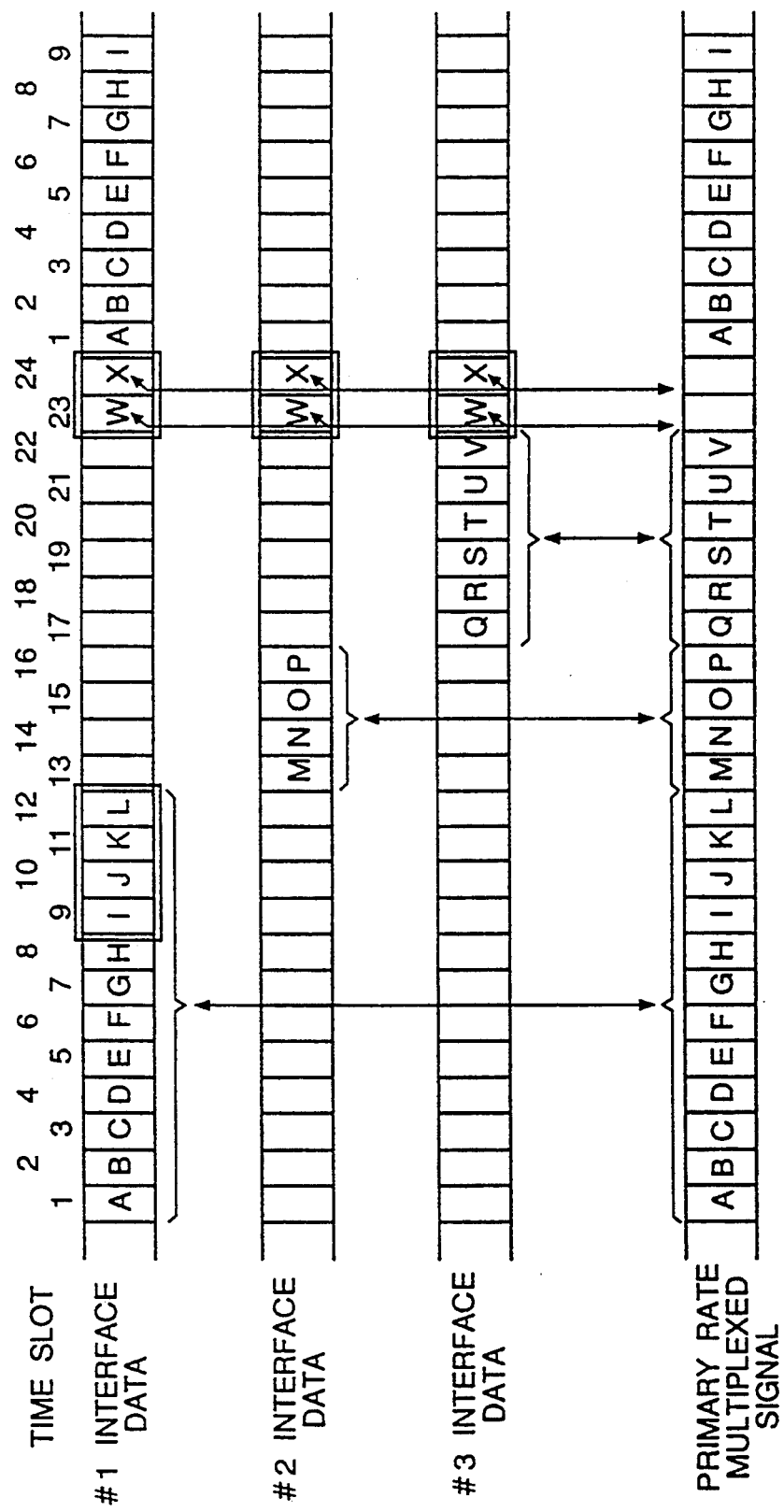
FIG. 5 is a timing chart showing how spare lines (channels) are shared by optical subscriber line interface units.

FIG. 5 shows a timing chart showing how spare lines (channels) are shared by the optical subscriber line interface units $21_1$–$21_3$ (#1–#3). It is possible to access respective, arbitrary time slots defined in each of the optical transmission lines $23_1$–$23_3$. FIG. 5 shows that time slots (channels) TS1–TS12 (A–L), TS23 (W) and TS24 (X) can be accessed (used) by the interface unit $21_1$ (#1), time slots TS13–TS16 (M–P), TS23 (W) and TS24 (X) can be accessed by the interface unit $21_2$ (#2), and time slots TS17–TS22 (Q–V), TS23 (W) and TS24 (X) can be accessed by the interface unit $21_3$ (#3). In the above case, time slots TS23 (W) and TS24 (X) function as spare lines, which are shared by the interface units $21_1$–$21_3$. According to the present invention, the spare lines are established in such a manner that the interface units $21_1$–$21_3$ directly share the predetermined time slots TS23 and TS24 without laying spare lines for the interface units $21_1$–$21_3$. The time slots correspond to channels.

Time slots TS9–TS12 (I–L) function as spare lines for the interface unit $21_1$. Since the quantity of data processed in each of the interface units $21_1$–$21_3$ can be changed, and can be defined time slots TS9–TS12 defined as spare lines specifically used by the interface unit $21_1$. The remaining eight time slots (channels) TS1–TS8 (A–H) are currently defined as lines for transferring data. By changing the setting time slots defined for the interface unit $21_1$, it is easily possible to define a maximum of 12 subscriber lines for the interface unit $21_1$. Hence, a hardware configuration for a subscriber who uses a large number of lines can be the same as that for a subscriber who uses a small number of lines. Time slots TS13–TS22 for the interface unit $21_1$ are unused in the example shown in FIG. 5.

Figure 6:
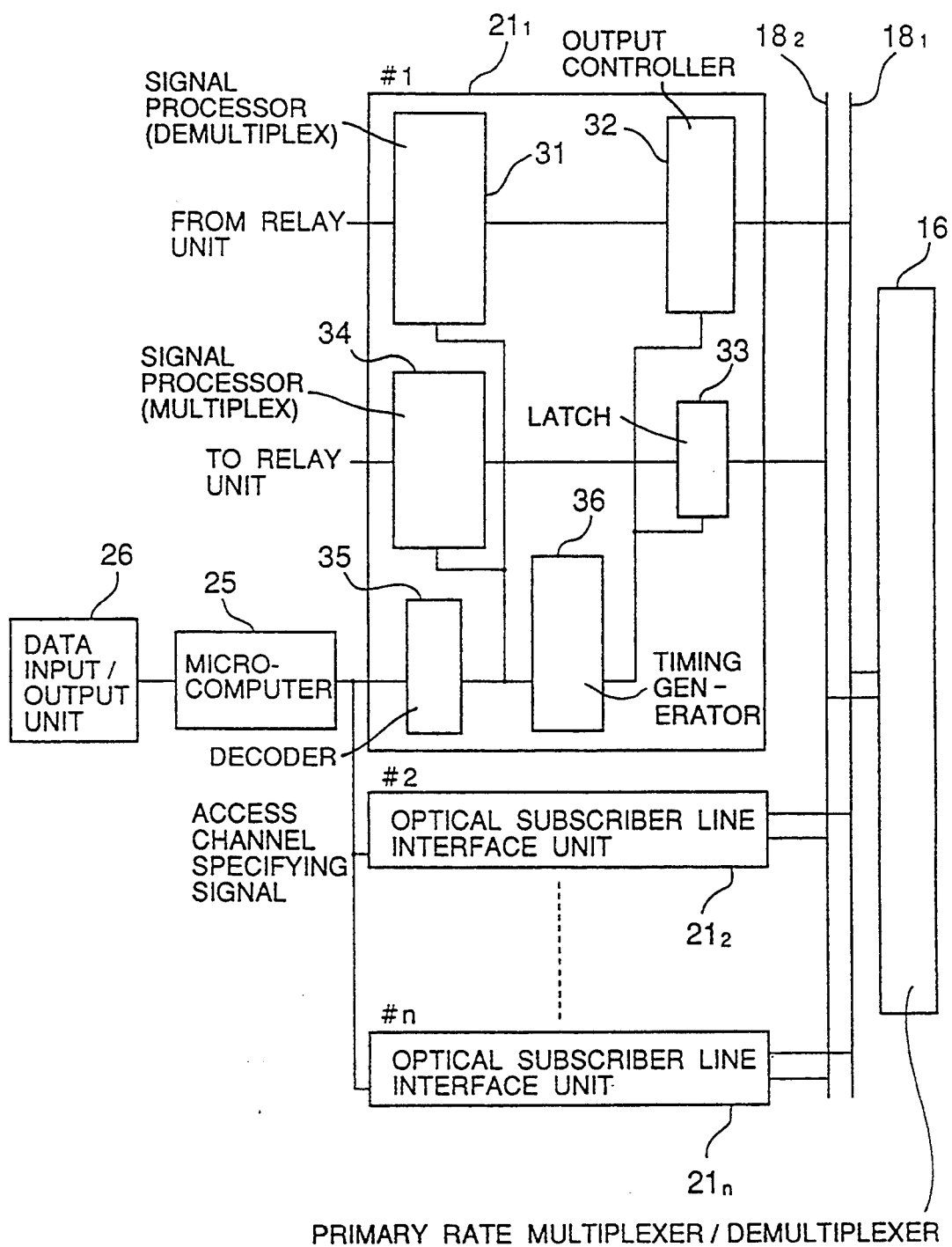
FIG. 6 is a block diagram of a multiplexer/demultiplexer unit shown in FIG. 4.

FIG. 6 shows more detail of the multiplexer/demultiplexer 1 shown in FIG. 4. The internal bus 18 comprises a sender (S) bus $18_1$ and a receiver (R) bus $18_2$. The optical subscriber line interface unit $21_1$ comprises a signal processor 31 having a demultiplexing function, an output controller 32, a latch circuit 33, a signal processor 34 having a multiplexing function, a decoder 35, and a timing generator 36. Each of the other optical subscriber line interface units $21_2$ and $21_3$ is configured in the same manner as the interface unit $21_1$. The multiplexer/demultiplexer unit 1 comprises a microcomputer 25 and a data input/output unit 26. The microcomputer 25 controls the optical subscriber line interface units $21_1$–$21_3$. The data input/output unit 26 comprises a keyboard and a display and/or a printer.

The signal processor 31 of the optical subscriber line interface unit $21_1$ demultiplexes a 1.5 MHz multiplexed signal sent from the relay unit $13_1$ through the optical transmission line $23_1$ into 64 kHz signals of 24 channels. The output controller 32 controls output timing with which the signals of the channels are output to the sender bus $18_1$. The latch circuit 33 latches signals from the receiver bus $18_2$ and outputs 64 kHz signals of the channels to the signal processor 34. The signal processor 34 multiplexes the 64 kHz signals from the latch circuit 33 with each other, and outputs a 1.5 MHz multiplexed signal to the relay unit $13_1$. The decoder 35 receives an access channel specifying signal from the microcomputer 25, and decodes it. The timing generator 36 generates, in accordance with a decoded signal from the decoder 35, timing signals specifying the time slot positions of the signals. The output controller 32 receives associated timing signals and controls the outputting of signals to the sender bus $18_1$. The latch circuit 33 receives associated timing signals and controls the inputting of signals from the receiver bus $18_2$.

Figure 7:
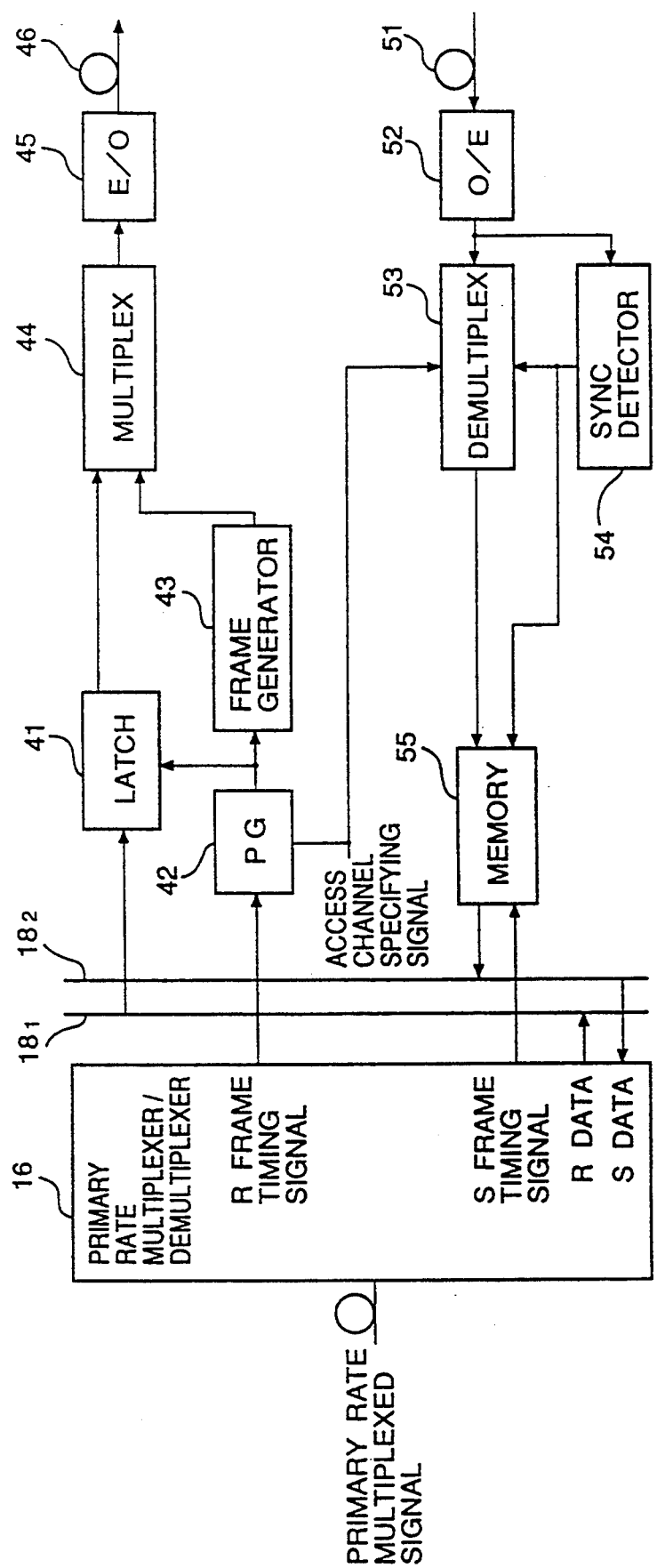
FIG. 7 is a block diagram of an optical subscriber line interface unit provided in each multiplexer/demultiplexer unit shown in FIG. 6.

FIG. 7 is a block diagram of the output controller 32 provided in each of the optical subscriber line interface units $21_1$–$21_3$. In FIG. 7, those parts which are the same as those shown in FIG. 6 are given the same reference numerals. The output controller 32 comprises a latch circuit 41, a pulse generator (PG) 42, a frame generator 43, a multiplexer 44, an electro-optic conversion device 45, and an optical transmission line 46 forming an optical transmission line. Further, the output controller 32 comprises an optical transmission line 51, an opto-electronic conversion device 52, a demultiplexer 53, a synchronization detector 54, and a memory 55 for use in format conversion.

The primary rate multiplexer/demultiplexer 16 demodulates the primary rate multiplexed signal in the form of a light signal, and generates a receive frame timing signal, which is applied to the pulse generator 42. Further, the primary rate multiplexer/demultiplexer 16 outputs received data derived from the primary rate multiplexed signal to the receiver bus $18_2$. The pulse generator 42 generates a timing pulse responsive to receipt of the access channel specifying signal from the microcomputer 25, and applies the timing pulse to the latch circuit 41. Further, the pulse generator 42 generates a trigger pulse synchronously with the receive frame timing signal from the primary rate multiplexer/demultiplexer 16, and applies the trigger pulse to the frame generator 43. The latch circuit 41 latches received data in response to receipt of the timing signal from the pulse generator 42, and generates 64 kHz data. The frame generator 43 generates, in response to receipt of the trigger pulse, a frame signal of the multiplexed signal to be transferred through the optical transmission line 46. The multiplexer 44 multiplexes data latched by the latch circuit 41 synchronously with the frame signal from the frame generator 43, and generates a 1.5 MHz multiplexed signal. The electrooptic conversion unit 45 converts the 1.5 MHz multiplexed signal into a light signal, which is output to the optical transmission line 46.

A light signal from the optical transmission line 51 is converted into an electric signal by the opto-electric conversion device 52, and a 1.5 MHz multiplexed signal is then generated. The synchronization detector 54 detects a synchronizing signal (frame bit) from the 1.5 MHz multiplexed signal, and extracts a frame signal therefrom. The demultiplexer 53 demultiplexes the 1.5 MHz multiplexed signal into 64 kHz data of the 24 channels, which are written into the memory 55. Data is read from the read operation of the memory 55 in response to a send frame timing signal from the primary rate multiplexer/demultiplexer 16, so that send data synchronized with a clock signal having the primary rate is output to the sender bus $18_1$. The primary rate multiplexer/demultiplexer 16 multiplexes the send data from the interface units $21_1$–$21_3$ with each other, and outputs a light signal to an optical transmission path.

Figure 8:
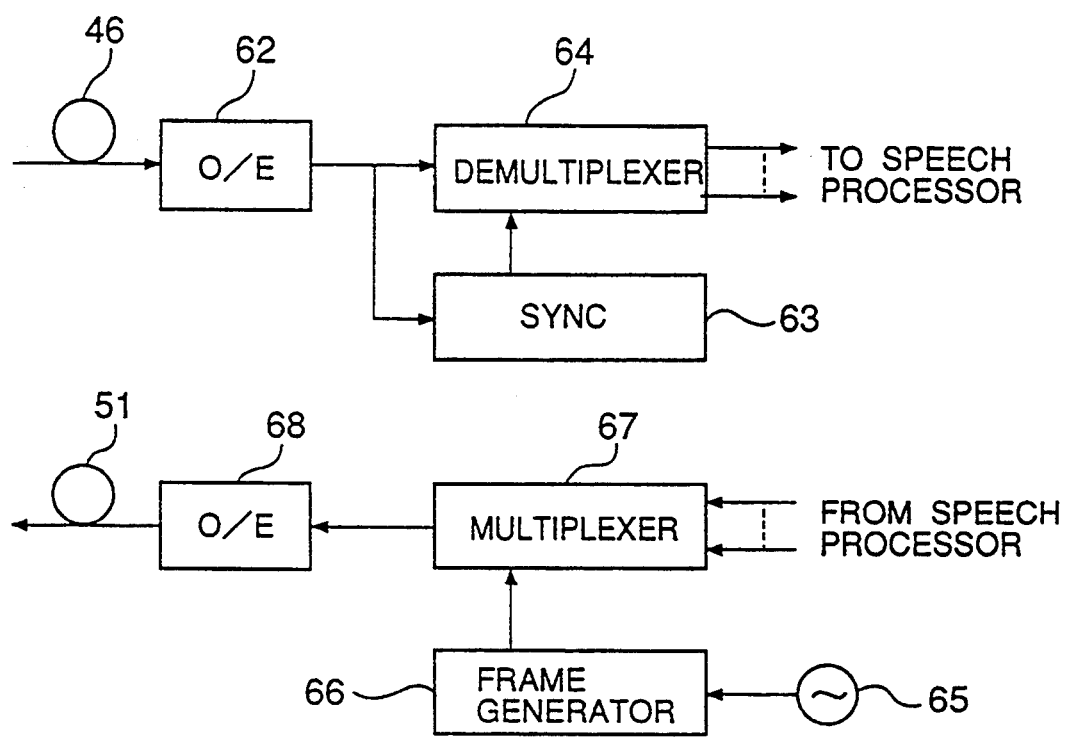
FIG. 8 is a block diagram of an optical subscriber line interface unit provided in each relay unit shown in FIG. 4.
Figure 9:
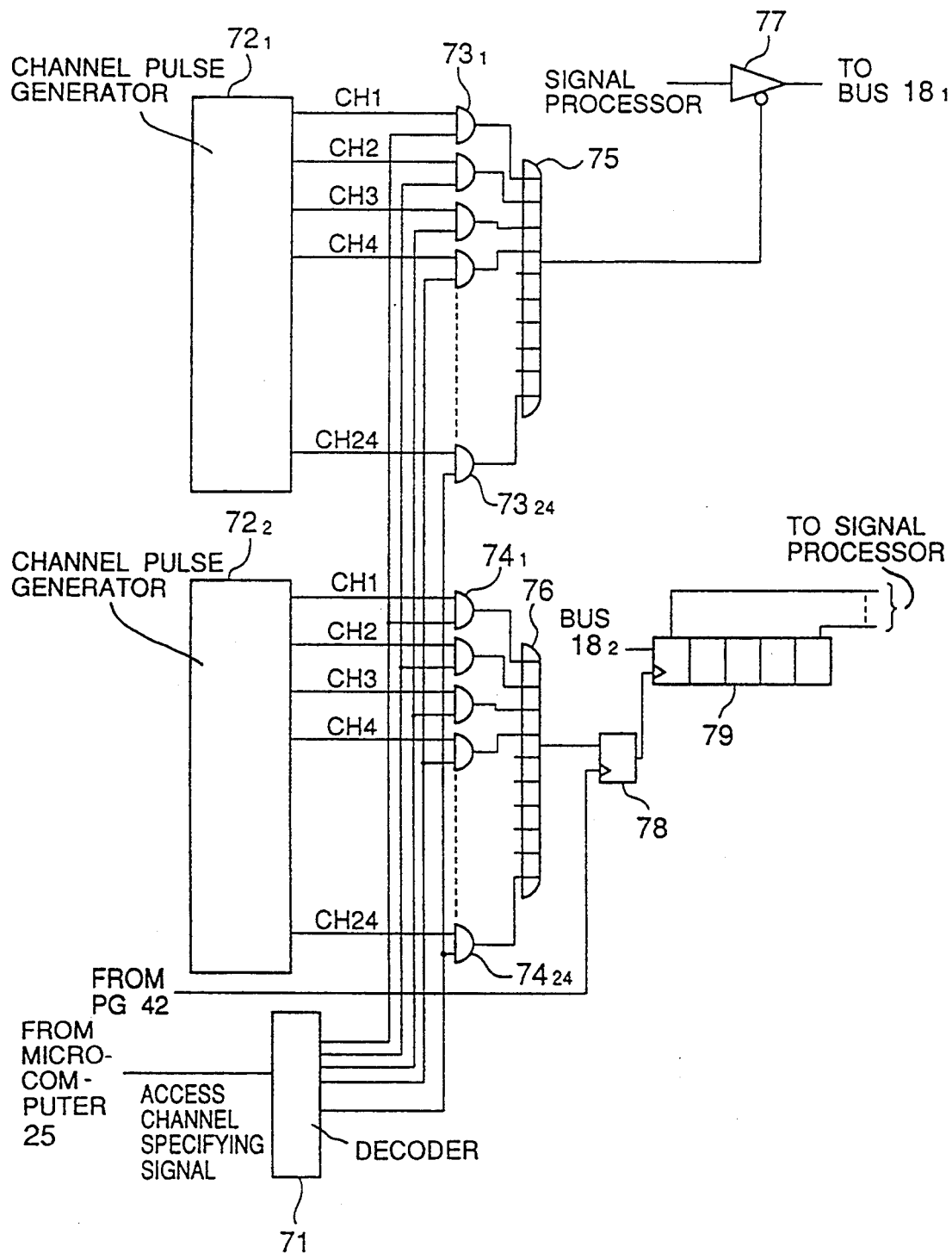
FIG. 9 is a more detailed block diagram of the optical subscriber line interface unit shown in FIG. 7.

FIG. 8 is a block diagram of each of the optical subscriber line interface units $22_1$–$22_3$ respectively provided in the relay units $13_1$–$13_3$. As shown in FIG. 8, each of the interface units $22_1$–$22_3$ comprises an opto-electric conversion device 62, a synchronizing unit 63, and a demultiplexer 64. Further, each of the interface units $22_1$–$22_3$ comprises a clock generator 65, a frame generator 66, a multiplexer 67, and an opto-electric conversion device 68.

A light signal from the optical transmission line 46 is converted into an electric signal by the opto-electric conversion device 62, and a 1.5 MHz multiplexed signal is generated. The synchronizing unit 63 detects a synchronizing signal contained in the 1.5 MHz multiplexed signal. The demultiplexer 64 demultiplexes, synchronously with the detected synchronizing signal, the 1.5 MHz multiplexed signal from the opto-electric conversion device 62 into speech signals on the 24 channels, which are output to one of the speech processors $17_1$–$17_3$.

Speech signals of the 24 channels from one of the speech processors $17_1$–$17_3$ are applied to the multiplexer 67. The frame generator 66 generates a frame signal by using a clock signal generated by the clock generator 65. The frame signal is applied to the multiplexer 67. The multiplexer 67 multiplexes speech signals from one of the speech processors $17_1$–$17_3$ with each other by using the frame signal, and generates a 1.5 MHz multiplexed signal. The opto-electric conversion circuit 68 converts the 1.5 MHz multiplexed signal into a light signal.

FIG. 6 shows the output controller 32, the latch circuit 33, the decoder 35 and the timing generator 36 shown in FIG. 6. A decoder 71 corresponds to the decoder 35 shown in FIG. 6. A configuration comprising channel pulse generators $72_1$ and $72_2$, AND gates $73_1$–$73_{24}$ and $74_1$–$74_{24}$, OR gates 75 and 76, and a flip-flop 78 correspond to the timing generator 36 shown in FIG. 6. A buffer 77 corresponds to the output controller 32 shown in FIG. 6, and a shift register 79 corresponds to the latch circuit 33. Each of the channel pulse generators $72_1$ and $72_2$ sequentially and repeatedly specifies one of the 24 channels (time slots). For example, when the channel pulse generators $72_1$ and $72_2$ specify respective channel CH1, corresponding lines extending therefrom is switched to a high level from a low level, for example. The decoder 71 receives the access channel specifying signal from the microcomputer 25 shown in FIG. 6, and outputs a decoded signal consisting of 24 bits to a group of AND gates $73_1$–$73_{24}$ and a group of AND gates $74_1$–$74_{24}$.

The channel access specifying signal applied to the interface unit $21_1$ has a bit pattern in which bits relating to channels #1–#8 respectively corresponding to time slots TS1–TS8 are set to the high level and the other bits are set to the low level. The channel access specifying signals applied to the interface unit $21_2$ and $21_3$ have respective bit patterns.

The OR gate 75 executes an OR logic operation on the output signals of the AND gates $73_1$–$73_{24}$, and outputs a resultant signal to the buffer 77. In this manner, data of the specified channels are output to the sender bus $18_1$. The OR gate 76 executes an OR logic operation on the output signals of the AND gates $74_1$–$74_{24}$, and outputs a resultant signal to the flip-flop 78, which is also supplied with a clock signal from the pulse generator 42 (FIG. 7). The flip-flop 78 outputs, to a clock terminal of the shift register 79, the output signal of the OR gate 76 latched in synchronism with the clock signal. Data from the receiver bus $18_2$ is applied to the shift register 79. The shift register 79 shifts the data from the receiver bus $18_2$ and outputs the data to the signal processor 34 in parallel form. In this manner, 24 64 kHz signals of the channels CH1–CH24 are derived from the 1.5 MHz multiplexed signal.

Figure 10:
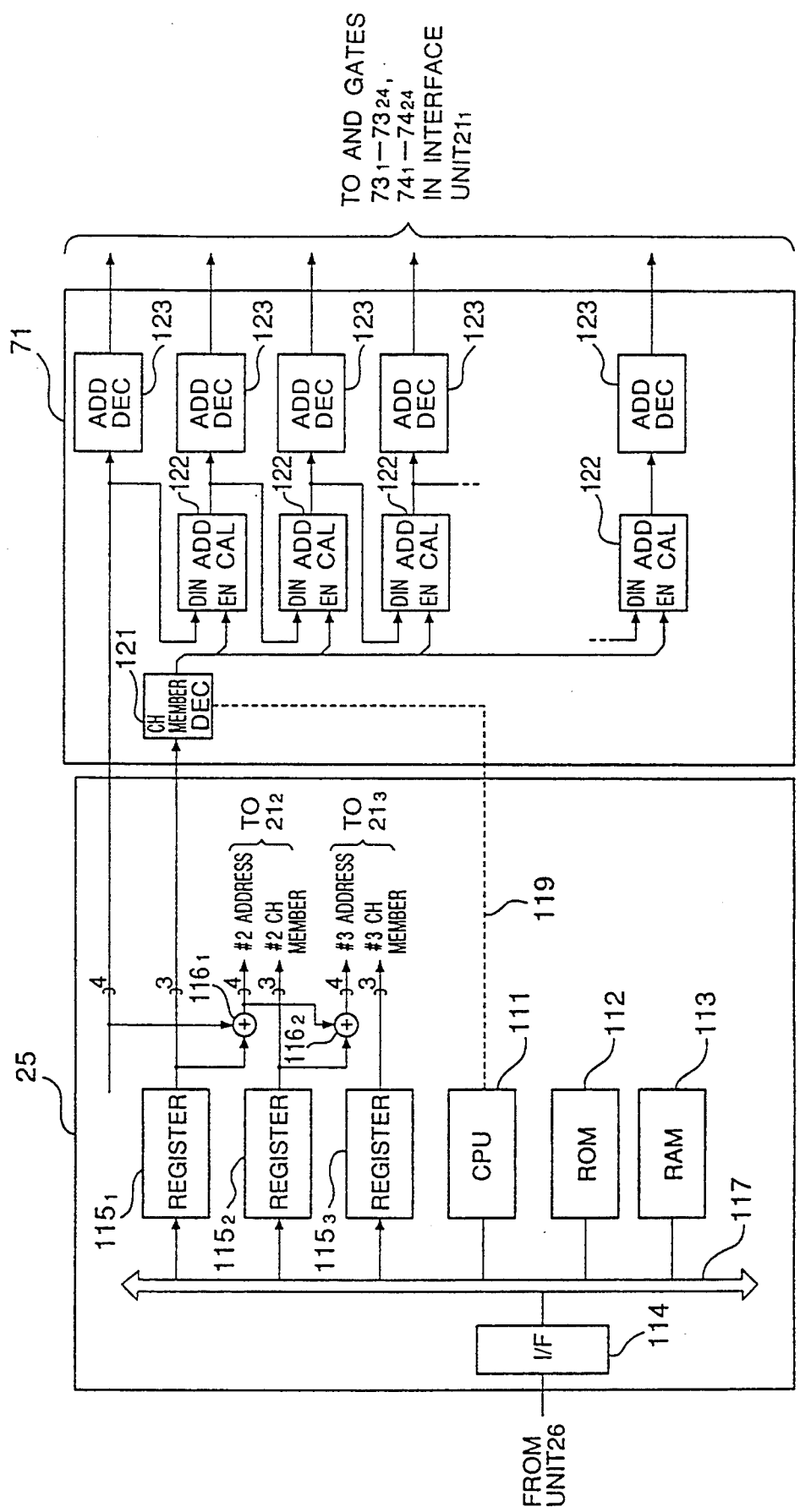
FIG. 10 is a block diagram showing a microcomputer and a decoder shown in FIG. 6.

FIG. 10 shows the microcomputer 25, and the decoder 35 which is provided in the interface unit $21_1$ shown in FIG. 6. The microcomputer 25 comprises a CPU 111, a ROM 112, a RAM 113, an interface circuit 114, registers $115_1$–$115_3$, adders $116_1$ and an internal bus 117. The interface circuit 114 establishes an interface between the data input/output unit 26 shown in FIG. 6 and the internal bus 117. The register $115_1$ stores data showing the number of channels handled by the interface unit $21_1$. In the case shown in FIG. 5, 8 channels are processed by the interface unit $21_1$. The register $115_2$ stores data showing the number of channels handled by the interface unit $21_2$, and the register $115_3$ stores data showing the number of channels handled by the interface unit $21_3$. The number of channels used can be specified using the data input/output unit 26.

The adder $116_1$ adds the number of channels used for the interface unit $21_1$ and "1". This value "1" indicates channel CH1. An output signal of the adder $116_1$ indicates the beginning channel among the channels used in the interface unit $21_2$. In the case shown in FIG. 5, the adder $116_1$ generates the signal indicating channel CH13. In the same manner, an output signal of the adder $116_2$ indicates the beginning channel among the channels used in the interface unit $21_3$.

The decoder 71 comprises a channel number decoder 121, address calculators (ADD CAL) 122 and address decoders (ADD DEC) 123. Data "1" from the microcomputer 25 is applied to the address decoder located at top of a column of the address decoders 123, and the address calculator 122 located at top of a column of the address calculators 122. If eight channels used in the interface unit $21_1$ are used, the channel decoder 121 generates decoded signals which activate the first seven address calculators 122 in the column of the address calculators 122. Data "1" is successively passed through the first seven address calculators 122, which output signals to the corresponding address decoders 123 at mutually different times. In response to receipt of the output signals from the first seven address calculators 122, the address decoders output decoded signals which specify channels CH2–CH8 at different times. Channel CH1 is specified by the address decoder 123 located at the top of the column.

If the interface unit $21_1$ uses the spare channel CH24 shared by the interface units $21_1$–$21_3$, the CPU 111 outputs, through a control line 119, an instruction signal to the channel number decoder 121 provided in the decoder 71 of the interface unit $21_1$ so that the decoded signal relating to channel CH24 is ON. In this manner, channel 24 is used specifically by the interface unit $21_1$. Use of the spare channels (lines) can be specified through the data input/output unit 26.

The output signal of the adder $116_1$ is applied to the address decoder 123 located at top of the column in the decoder 71 of the interface unit $21_2$, and the address calculator 122 located at the top of the column in the decoder 71 of the interface unit $21_2$.

Figure 11:
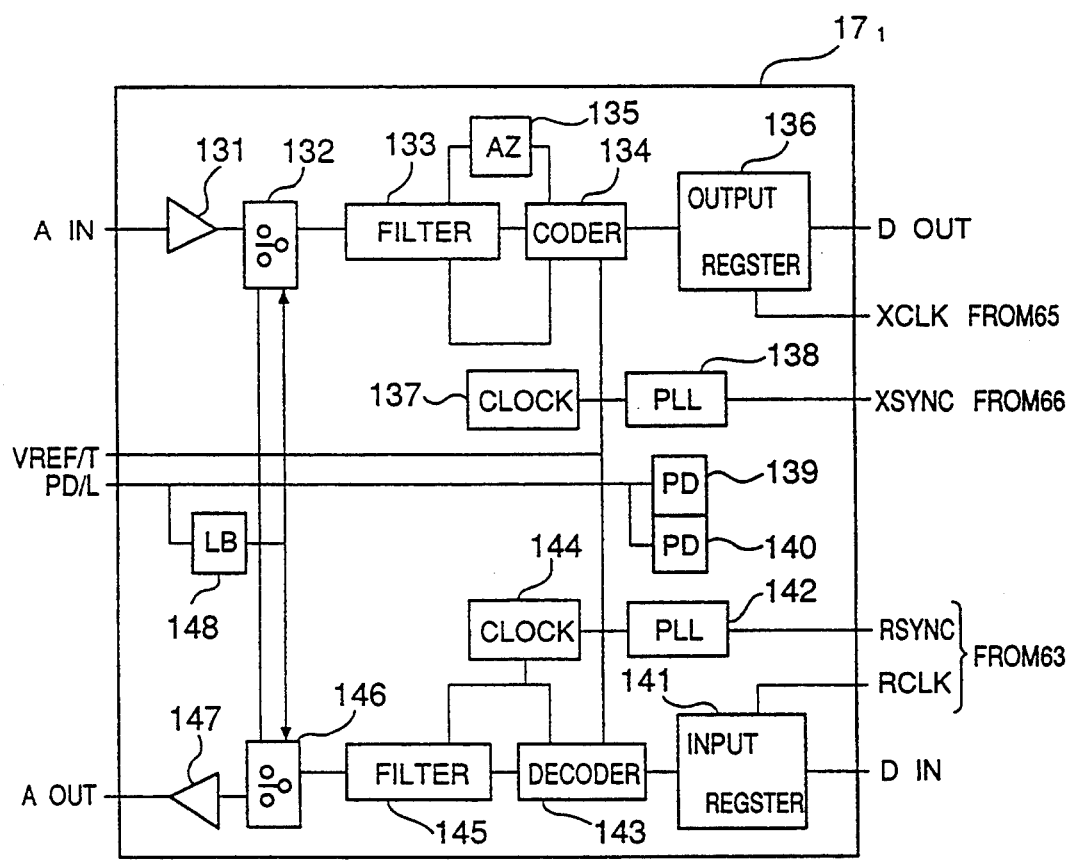
FIG. 11 is a block diagram of a speech processor provided in each relay unit.

FIG. 11 shows the speech processor $17_1$. The other speech processors $17_2$ and $17_3$ are configured in the same manner as shown in FIG. 11. The speech processor $17_1$ comprises a buffer amplifier 131, a switch 132, a filter 133, a coder 134, a feedback circuit (AZ) 135, an output register 136, a clock generator 137, a PLL circuit 138, and a phase detector (PD) 139. Further, the speech processor $17_1$ comprises a phase detector (PD) 140, an input register 141, a decoder 143, a clock generator 144, a filter 145, a switch 146, a buffer amplifier 147 and a loop-back circuit 148. An analog speech signal (A IN) from a subscriber terminal (not shown) passes through the buffer amplifier 131, the switch 132 and the filter 133, and is applied to the coder 134. The filter 133 is an anti-aliasing filter. The coder 134 digitizes the input analog speech signal. A digital speech signal (D OUT) is output to the interface unit $22_1$. The clock signal (master clock signal), labeled SCLK, is applied to the output register 136 from the clock generator 65 shown in FIG. 8 via a line (not shown for the sake of simplicity). The synchronizing signal generated by the frame generator 66, now labeled XSYNC, is applied to the PLL circuit 138. A frequency signal generated by the PLL circuit 138 is applied to the clock generator 137, which generates a clock signal applied to the filter 133 and the coder 134. The coder 134 is supplied with a reference voltage VREF/T used for the coding operation.

The synchronizing signal, labeled RSYNC, and a clock signal RCLK, both of which are generated by the synchronizing unit 63 shown in FIG. 8, are applied to the PLL circuit $14_2$ and the input register 144, respectively. A digital speech signal (D IN) is temporarily stored in the input register 144 and applied to the decoder 143. The decoder 143 converts the digital speech signal into an analog speech signal, which passes through the filter 145, the switch 146 and the buffer amplifier 147. An analog speech signal (A OUT) obtained at the output terminal of the buffer amplifier 147 is output to the subscriber terminal. The PLL circuit 142 and the clock generator 144 operate in the same manner as the PLL circuit 138 and the clock generator 137, respectively. The loop-back circuit 148 is activated by a control signal PD/L when a loop-back test is made.

Figure 12:
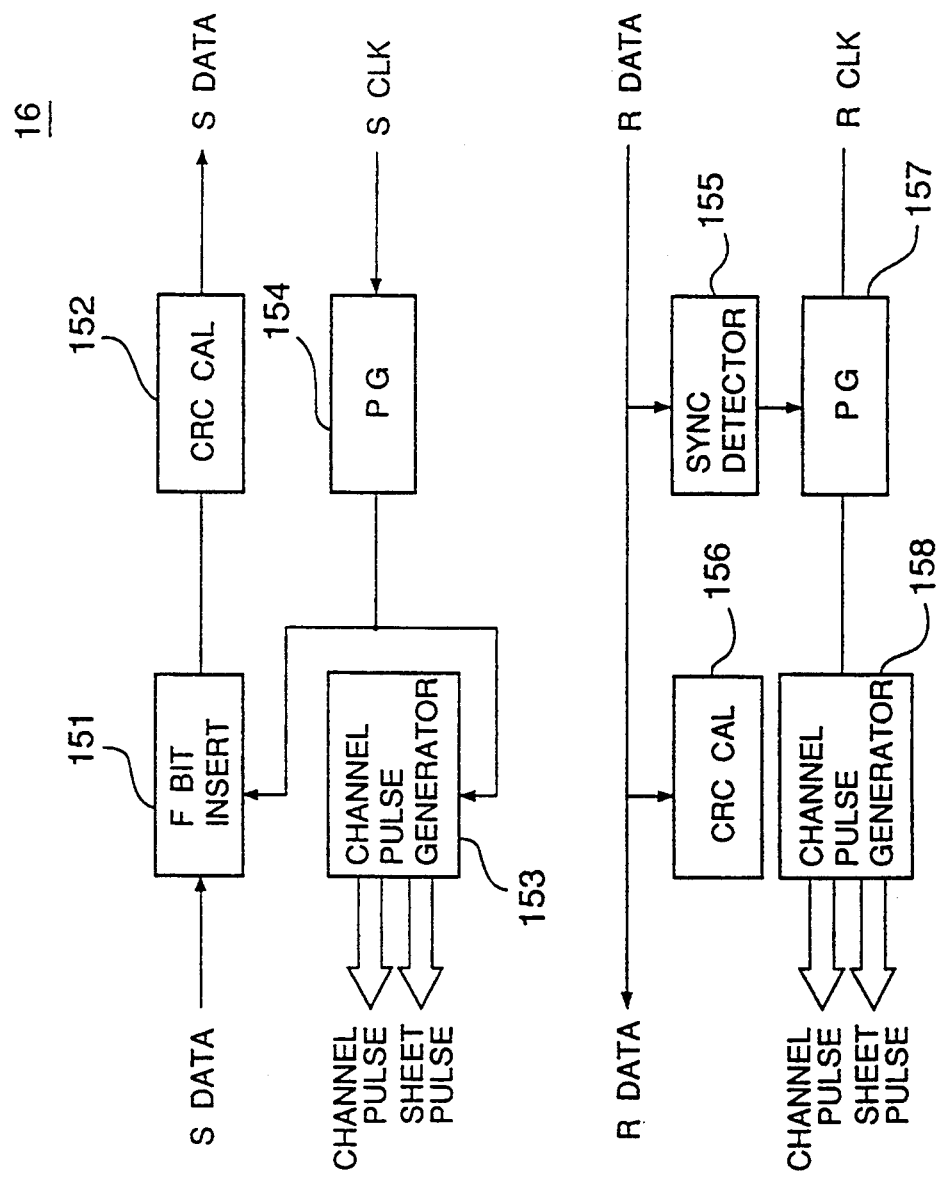
FIG. 12 is a block diagram of the multiplexer/demultiplexer unit shown in FIG. 6.

FIG. 12 shows the multiplexer/demultiplexer unit 1. As shown, the multiplexer/demultiplexer unit 1 comprises a frame bit inserting circuit 151, a CRC operation circuit 152, a channel pulse generator 153, and a pulse generator 154. Further the multiplexer/demultiplexer unit 1 comprises a synchronization detector 155, a CRC operation circuit 156, a pulse generator 157 and a channel pulse generator 158. Data to be sent (S DATA) from one of the interface units $21_1$–$21_3$ is applied to the frame bit inserting circuit 151, which inserts a frame bit for use in synchronization into the data. The data on a bus (not shown) is selected by the channel pulse generator 153 and applied to the frame bit inserting circuit 151. The channel pulse generator 153 generates channel pulses and sheet pulses as in the conventional technique. The frame bit inserting circuit 151 and the channel pulse generator 153 operate synchronously with a pulse signal generated by the pulse generator 154, to which a clock signal SCLK is applied. The data with the frame bit added thereto is subjected to the CRC operation, and then output to the optical fiber cable as a multiplexed light signal.

A multiplexed light signal received via the optical fiber cable is applied to the above bus, the synchronization detector 155, and the CRC operation circuit 156. The synchronization detector 155 detects the frame bit, and informs the pulse generator 157 of the time when the frame bit is detected. The pulse generator 157 receives a clock signal RCLK, and generates a pulse signal synchronized with the frame bit. The CRC operation circuit 156 detects an error in the received data and corrects an error correction operation. The channel pulse generator 158 generates channel pulses and sheet pulses using the pulse signal from the pulse generator 157. The channel pulses and sheet pulses are applied to the bus in order to demultiplex the received data (1.5 MHz signal) into 64 kHz signals.

The present invention is not limited to the specifically disclosed embodiments, and variations and modifications may be made without departing from the scope of the present invention.

What is claimed is:

1. An optical subscriber line system, connected to subscriber terminals transmitting analog signals, having an optical transmission medium transferring a first multiplexed light signal, said optical subscriber line system comprising:
   a plurality of optical transmission paths, each optical transmission path having a plurality of channels including at least one idle channel used as a spare channel and transferring a second multiplexed light signal;
   a multiplexer/demultiplexer unit connected to the optical transmission medium and to the plurality of optical transmission paths, said multiplexer/demultiplexer unit comprising:
      multiplexer/demultiplexer means for selectively performing multiplexing and demultiplexing operations, variously on a first multiplexed light signal and first digital signals, and
      first interface means, respectively provided for each of the optical transmission paths, for establishing a first interface between the first digital signals and second multiplexed light signals respectively transferred through the plurality of optical transmission paths; and
   a plurality of relay units, connected to the plurality of optical transmission paths and to the subscriber terminals, each relay unit comprising:
      second interface means for establishing a second interface between the second multiplexed light signals and second digital signals, and
      speech processing means, coupled to said second interface means, for converting the second digital signals into analog signals supplied to the subscriber terminals and for converting the analog signals transmitted from the subscriber terminals into the second digital signals,
   wherein the at least one idle channel is shared by the multiplexer/demultiplexer unit and the plurality of relay units.

2. An optical subscriber line system as claimed in claim 1, wherein the plurality of channels comprise a first subset of channels and at least a second subset of channels and the first multiplexed light signal is transferred by the first subset channels and the second multiplexed light signals are transferred by the at least a second subset of channels, and wherein the first subset of channels is greater than the at least a second subset of channels.

3. An optical subscriber line system as claimed in claim 2, wherein the multiplexer/demultiplexer unit further comprises access means for accessing, for each of the plurality of optical transmission paths, predetermined channels among the at least a second subset of channels.

4. An optical subscriber line system as claimed in claim 2, wherein each of said interface means comprises:
   first converting means for converting one of the second multiplexed light signals into a first electric signal;
   demultiplexer means, coupled to said first converting means, for deriving said second digital signals from said first electric signal;
   multiplexing means for multiplexing the second digital signals from the speech processing means with each other to thereby generate second electric signals; and
   second converting means for converting the second electric signals into one of the second multiplexed light signals.

5. An optical subscriber line system as claimed in claim 2, wherein:
   the multiplexer/demultiplexer unit further comprises first access means for accessing, for each of the plurality of optical transmission paths, predetermined channels among the at least a second subset of channels, and
   each of said first interface means and said second interface means comprises:
      first converting means for converting one of the second multiplexed light signals into a first electric signal;
      demultiplexer means, coupled to said first converting means, for deriving said second digital signals from said first electric signal;
      multiplexing means for multiplexing the second digital signals from the speech processing means with each other to thereby generate second electric signals; and
      second converting means for converting the second electric signals into one of the second multiplexed light signals.

6. An optical subscriber line system as claimed in claim 2, wherein the spare channel is shared by the first interface means, and wherein said multiplexer/demultiplexer unit comprises spare channel specifying means for specifying which one of the first interface means respectively provided for the plurality of optical transmission paths uses said spare channel.

7. An optical subscriber line system as claimed in claim 3, wherein said access means comprises channel specifying means for specifying, for each of the first interface means, channels to be used, producing specified channels corresponding to said predetermined channels.

8. An optical subscriber line system as claimed in claim 5, wherein:
   said access means comprises channel specifying means for specifying, for each of the first interface means, channels to be used; and
   specified channels correspond to said predetermined channels.

9. An optical subscriber line system comprising:
   a multiplexer/demultiplexer unit connected to an optical transmission medium;
   a plurality of relay units to which subscriber terminals are connected; and
   a plurality of optical transmission paths optically connecting the multiplexer/demultiplexer unit and the relay units to each other, wherein the multiplexer/demultiplexer unit comprises:

multiplexer/demultiplexer means for selectively performing multiplexing and demultiplexing operations, variously on a first multiplexed signal and first digital signals, said first multiplexed signal being transferred, in the form of a light signal, through the optical transmission medium;

first interface means, respectively provided for the plurality of optical transmission paths, for establishing a first interface between the first digital signals and second multiplexed light signals respectively transferred through the plurality of optical transmission paths; and access means for accessing, for each of the plurality of optical transmission paths, predetermined channels among the channels included in one of the second multiplexed light signals, wherein the relay units respectively comprise:

second interface means for establishing a second interface between the second multiplexed light signals and second digital signals; and speech processing means, coupled to said second interface means, for converting the second digital signals into analog signals supplied to the subscriber terminals and for converting analog signals from the subscriber terminals into the second digital signals, wherein the first multiplexed signal is transferred by more channels than those transferring each of the second multiplexed light signals, wherein each of said first interface means comprises:

converting means for converting the second multiplexed light signal into an electric signal corresponding to one of the first digital signals;

pulse generating means for generating a pulse signal sequentially specifying the predetermined channels; and buffer means, coupled to said converting means and said pulse generating means, for allowing the electric signal to pass through the buffer means in response to receipt of the pulse signal from the pulse generating means.

10. An optical subscriber line system comprising:

a multiplexer/demultiplexer unit connected to an optical transmission medium;

a plurality of relay units to which subscriber terminals are connected; and a plurality of optical transmission paths optically connecting the multiplexer/demultiplexer unit and the relay units to each other, wherein the multiplexer/demultiplexer unit comprises:

multiplexer/demultiplexer means for selectively performing multiplexing and demultiplexing operations, variously on a first multiplexed signal and first digital signals, said first multiplexed signal being transferred, in the form of a light signal, through the optical transmission medium;

first interface means, respectively provided for the plurality of optical transmission paths, for establishing a first interface between the first digital signals and second multiplexed light signals respectively transferred through the plurality of optical transmission paths; and access means for accessing, for each of the plurality of optical transmission paths, predetermined channels among the channels included in one of the second multiplexed light signals, wherein the relay units respectively comprise:

second interface means for establishing a second interface between the second multiplexed light signals and second digital signals; and speech processing means, coupled to said second interface means, for converting the second digital signals into analog signals supplied to the subscriber terminals and for converting analog signals from the subscriber terminals into the second digital signals, wherein the first multiplexed signal is transferred by more channels than those transferring each of the second multiplexed light signals, wherein each of said first interface means comprises:

pulse generating means for generating a pulse signal sequentially specifying the predetermined channels;

shift register means, coupled to said pulse generating means, for sequentially storing the first digital signals and outputting the first digital signals in parallel;

multiplexer means, coupled to said shift register means, for multiplexing the first digital signals in parallel with each other to thereby generate an electric multiplexed signal; and converting means, coupled to said multiplexer means, for converting the electric multiplexed signal into the second multiplexed light signal.

11. An optical subscriber line system comprising:

a multiplexer/demultiplexer unit connected to an optical transmission medium;

a plurality of relay units to which subscriber terminals are connected; and a plurality of optical transmission paths optically connecting the multiplexer/demultiplexer unit and the relay units to each other, wherein the multiplexer/demultiplexer unit comprises:

multiplexer/demultiplexer means for selectively performing multiplexing and demultiplexing operations, variously on a first multiplexed signal and first digital signals, said first multiplexed signal being transferred, in the form of a light signal, through the optical transmission medium;

first interface means, respectively provided for the plurality of optical transmission paths, for establishing a first interface between the first digital signals and second multiplexed light signals respectively transferred through the plurality of optical transmission paths; and access means for accessing, for each of the plurality of optical transmission paths, predetermined channels among the channels included in one of the second multiplexed light signals, wherein the relay units respectively comprise:

second interface means for establishing a second interface between the second multiplexed light signals and second digital signals; and speech processing means, coupled to said second interface means, for converting the second digital signals into analog signals supplied to the subscriber terminals and for converting analog signals from the subscriber terminals into the second digital signals, wherein the first multiplexed signal is transferred by more channels than those transferring each of the second multiplexed light signals, wherein each of said first interface means comprises:

first converting means for converting the second multiplexed light signal into a first electric signal corresponding to one of the first digital signals;

pulse generating means for generating a pulse signal sequentially specifying the predetermined channels;

buffer means, coupled to said converting means and said pulse generating means, for allowing the electrical signal to pass through the buffer means in response to receipt of the pulse signal from the pulse generating means;

shift register means, coupled to said pulse generating means, for sequentially storing the first digital signals and outputting the first digital signals in parallel;

multiplexer means, coupled to said shift register means, for multiplexing the first digital signals in parallel with each other to thereby generate a second electric multiplexed signal; and second converting means, coupled to said multiplexer means, for converting the second electric multiplexed signal into the second multiplexed light signal.

12. An optical subscriber line system as claimed in claim 1, wherein the plurality of channels comprises a first subset of channels and at least a second subset of channels, the first multiplexed light signal is transferred by a first subset of channels and the second multiplexed light signals are transferred by at least a second subset of channels, and the first subset of channels is equal to total of the at least a second subset of channels.

13. An optical subscriber line system as claimed in claim 1, wherein said first interface means comprises a bus transferring the first digital signals.

14. An optical subscriber line system, connected to subscriber terminals, having an optical transmission medium transferring a first multiplexed light signal, said optical subscriber line system comprising:

a plurality of optical transmission paths, each optical transmission path having a plurality of channels including at least one idle channel used as a spare channel and transferring a second multiplexed light signal;

a multiplexer/demultiplexer unit connected to the optical transmission medium and to the plurality of optical transmission paths, said multiplexer/demultiplexer unit comprising:

multiplexer/demultiplexer means for selectively performing multiplexing and demultiplexing operations, variously on the first multiplexed light signal and first electric signals, and first interface means, respectively provided for each of the optical transmission paths, for establishing a first interface between the first electric signals and second multiplexed light signals respectively transferred through the plurality of optical transmission paths; and a plurality of relay units, connected to the plurality of optical transmission paths and to the subscriber terminals, each relay unit comprising:

second interface means for establishing a second interface between the second multiplexed light signals and second electric signals, and speech processing means, coupled to said second interface means, for converting the second electric signals into third electric signals supplied to the subscriber terminals and for converting the third electric signals transmitted from the subscriber terminals into the second electric signals, wherein the at least one idle channel is shared by the multiplexer/demultiplexer unit and the plurality of relay units.

15. An optical subscriber line system as claimed in claim 14, wherein the plurality of channels comprise a first subset of channels and at least a second subset of channels and the first multiplexed light signal is transferred by the first subset of channels and the second multiplexed light signals are transferred by the at least a second subset of channels, and wherein the first subset of channels is greater than the at least a second subset of channels.

16. An optical subscriber line system as claimed in claim 15, wherein the multiplexer/demultiplexer unit further comprises access means for accessing, for each of the plurality of optical transmission paths, predetermined channels among the at least a second subset of channels.

17. An optical subscriber line system as claimed in claim 15, wherein each of said interface means comprises:

first converting means for converting one of the second multiplexed light signals into a fourth electric signal;

demultiplexer means, coupled to said first converting means, for deriving said second electric signals from said fourth electric signal;

multiplexing means for multiplexing the second electric signals from the speech processing means with each other to thereby generate fifth electric signals; and second converting means for converting the fifth electric signals into one of the second multiplexed light signals.

18. An optical subscriber line system as claimed in claim 15, wherein:

the multiplexer/demultiplexer unit further comprises first access means for accessing, for each of the plurality of optical transmission paths, predetermined channels among the at least a second subset of channels, and each of said first interface means and said second interface means comprises:

first converting means for converting one of the second multiplexed light signals into a fourth electric signal;

demultiplexer means, coupled to said first converting means, for deriving said second electric signals from said fourth electric signal;

multiplexing means for multiplexing the second electric signals from the speech processing means with each other to thereby generate fifth electric signals; and second converting means for converting the fifth electric signals into one of the second multiplexed light signals.

19. An optical subscriber line system as claimed in claim 15, wherein the spare channel is shared by the first interface means, and wherein said multiplexer/demultiplexer unit comprises spare channel specifying means for specifying which one of the first interface means respectively provided for the plurality of optical transmission paths uses said spare channel.

20. An optical subscriber line system as claimed in claim 16, wherein said access means comprises channel specifying means for specifying, for each of the first interface means, channels to be used, producing specified channels corresponding to said predetermined channels.

21. An optical subscriber line system as claimed in claim 18, wherein:
   said access means comprises channel specifying means for specifying, for each of the first interface means, channels to be used; and
   specified channels correspond to said predetermined channels.

22. An optical subscriber line system comprising:
   a multiplexer/demultiplexer unit connected to an optical transmission medium;
   a plurality of relay units to which subscriber terminals are connected; and
   a plurality of optical transmission paths optically connecting the multiplexer/demultiplexer unit and the relay units to each other,
   wherein the multiplexer/demultiplexer unit comprises:
      multiplexer/demultiplexer means for selectively performing multiplexing and demultiplexing operations, variously on a first multiplexed signal and first electric signals, said first multiplexed signal being transferred, in the form of a light signal, through the optical transmission medium;
      first interface means, respectively provided for the plurality of optical transmission paths, for establishing a first interface between the first electric signals and second multiplexed light signals respectively transferred through the plurality of optical transmission paths; and
      access means for accessing, for each of the plurality of optical transmission paths, predetermined channels among the channels included in one of the second multiplexed light signals,
   wherein the relay units respectively comprise:
      second interface means for establishing a second interface between the second multiplexed light signals and second electric signals; and
      speech processing means, coupled to said second interface means, for converting the second electric signals into third electric signals supplied to the subscriber terminals and for converting third electric signals from the subscriber terminals into the second electric signals,
   wherein the first multiplexed signal is transferred by more channels than those transferring each of the second multiplexed light signals,
   wherein each of said first interface means comprises:
      converting means for converting the second multiplexed light signal into an electric signal corresponding to one of the first electric signals;
      pulse generating means for generating a pulse signal sequentially specifying the predetermined channels; and
      buffer means, coupled to said converting means and said pulse generating means, for allowing the electric signal to pass through the buffer means in response to receipt of the pulse signal from the pulse generating means.

23. An optical subscriber line system comprising:
   a multiplexer/demultiplexer unit connected to an optical transmission medium;
   a plurality of relay units to which subscriber terminals are connected; and
   a plurality of optical transmission paths optically connecting the multiplexer/demultiplexer unit and the relay units to each other,
   wherein the multiplexer/demultiplexer unit comprises:
      multiplexer/demultiplexer means for selectively performing multiplexing and demultiplexing operations, variously on a first multiplexed signal and first electric signals, said first multiplexed signal being transferred, in the form of a light signal, through the optical transmission medium;
      first interface means, respectively provided for the plurality of optical transmission paths, for establishing a first interface between the first electric signals and second multiplexed light signals respectively transferred through the plurality of optical transmission paths; and
      access means for accessing, for each of the plurality of optical transmission paths, predetermined channels among the channels included in one of the second multiplexed light signals,
   wherein the relay units respectively comprise:
      second interface means for establishing a second interface between the second multiplexed light signals and second electric signals; and
      speech processing means, coupled to said second interface means, for converting the second electric signals into third electric signals supplied to the subscriber terminals and for converting third electric signals from the subscriber terminals into the second electric signals,
   wherein the first multiplexed signal is transferred by more channels than those transferring each of the second multiplexed light signals,
   wherein each of said first interface means comprises:
      pulse generating means for generating a pulse signal sequentially specifying the predetermined channels;
      shift register means, coupled to said pulse generating means, for sequentially storing the first electric signals and outputting the first electric signals in parallel;
      multiplexer means, coupled to said shift register means, for multiplexing the first electric signals in parallel with each other to thereby generate an electric multiplexed signal; and
      converting means, coupled to said multiplexer means, for converting the electric multiplexed signal into the second multiplexed light signal.

24. An optical subscriber line system comprising:
   a multiplexer/demultiplexer unit connected to an optical transmission medium;
   a plurality of relay units to which subscriber terminals are connected; and
   a plurality of optical transmission paths optically connecting the multiplexer/demultiplexer unit and the relay units to each other,
   wherein the multiplexer/demultiplexer unit comprises:
      multiplexer/demultiplexer means for selectively performing multiplexing and demultiplexing operations, variously on a first multiplexed signal and first electric signals, said first multiplexed signal being transferred, in the form of a light signal, through the optical transmission medium;

first interface means, respectively provided for the plurality of optical transmission paths, for establishing a first interface between the first electric signals and second multiplexed light signals respectively transferred through the plurality of optical transmission paths; and access means for accessing, for each of the plurality of optical transmission paths, predetermined channels among the channels included in one of the second multiplexed light signals, wherein the relay units respectively comprise:

second interface means for establishing a second interface between the second multiplexed light signals and second electric signals; and speech processing means, coupled to said second interface means, for converting the second electric signals into third electric signals supplied to the subscriber terminals and for converting third electric signals from the subscriber terminals into the second electric signals, wherein the first multiplexed signal is transferred by more channels than those transferring each of the second multiplexed light signals, wherein each of said first interface means comprises:

first converting means for converting the second multiplexed light signal into a fourth electric signal corresponding to one of the first electric signals;

pulse generating means for generating a pulse signal sequentially specifying the predetermined channels;

buffer means, coupled to said converting means and said pulse generating means, for allowing the electrical signal to pass through the buffer means in response to receipt of the pulse signal from the pulse generating means;

shift register means, coupled to said pulse generating means, for sequentially storing the first electric signals and outputting the first electric signals in parallel;

multiplexer means, coupled to said shift register means, for multiplexing the first electric signals in parallel with each other to thereby generate a second electric multiplexed signal; and second converting means, coupled to said multiplexer means, for converting the second electric multiplexed signal into the second multiplexed light signal.

25. An optical subscriber line system as claimed in claim 14, wherein the plurality of channels comprises a first subset of channels and at least a second subset of channels, the first multiplexed light signal is transferred by a first subset of channels and the second multiplexed light signals are transferred by at least a second subset of channels, and the first subset of channels is equal to total of the at least a second subset of channels.

26. An optical subscriber line system as claimed in claim 14, wherein said first interface means comprises a bus transferring the first electric signals.

* * * * *

UNITED STATES PATENT AND TRADEMARK OFFICE
CERTIFICATE OF CORRECTION

PATENT NO. : 5,448,388
DATED : September 5, 1995
INVENTOR(S) : Hiroyuki OHDE et al.

It is certified that error appears in the above-indentified patent and that said Letters Patent is hereby corrected as shown below:

Title Page - Item [56] References Cited, fourth reference, change "359/137" to --358/86--;

fifth reference, change "370/112" to --370/55.1--;

sixth reference, change "370/112" to --370/80--;

seventh reference, change "359/117" to --340/825.14--.

Column 1, line 54, after "a" insert --common--.

Column 4, line 32, delete "and can be defined", and after "TS9-TS12" insert --can be--.

UNITED STATES PATENT AND TRADEMARK OFFICE
CERTIFICATE OF CORRECTION

PATENT NO. : 5,448,388
DATED : September 5, 1995
INVENTOR(S) : Hiroyuki OHDE et al It is certified that error appears in the above-indentified patent and that said Letters Patent is hereby corrected as shown below:

Column 8, line 29, change "$14_2$" to --142--.

Signed and Sealed this

Fifth Day of December, 1995

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,448,388
DATED : September 5, 1995
INVENTOR(S) : Hiroyuki OHDE et al.

It is certified that error appears in the above-indentified patent and that said Letters Patent is hereby corrected as shown below:

Title Page - Item [75] Inventors:

"Hiroyuki Ohde; Noriyuki Kutsuwada, both of Kawasaki, Japan"

should be

--Hiroyuki Ohde, Yokohama; Noriyuki Kutsuwada, Kawasaki, both of Japan--.

Signed and Sealed this

Eleventh Day of March, 1997

*Attest:*

BRUCE LEHMAN

*Attesting Officer*  *Commissioner of Patents and Trademarks*